(12) United States Patent
Cho et al.

(10) Patent No.: US 9,756,382 B2
(45) Date of Patent: Sep. 5, 2017

(54) SYSTEM AND METHOD FOR OPERATING ELECTRONIC DEVICE SUPPORTING ENHANCED DATA PROCESSING, APPARATUS AND TERMINAL SUPPORTING THE SAME

(71) Applicant: Samsung Electronics Co., Ltd., Gyeonggi-do (KR)

(72) Inventors: Hyungrae Cho, Seoul (KR); Kangmin Lee, Gyeonggi-do (KR); Jihyeon Kweon, Gyeonggi-do (KR); Seokmin Oh, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 599 days.

(21) Appl. No.: 13/661,622

(22) Filed: Oct. 26, 2012

(65) Prior Publication Data

US 2013/0110975 A1  May 2, 2013

(30) Foreign Application Priority Data

Oct. 26, 2011  (KR) ........................ 10-2011-0109807

(51) Int. Cl.
*G06F 15/16* (2006.01)
*H04N 21/436* (2011.01)
(Continued)

(52) U.S. Cl.
CPC ..... *H04N 21/43615* (2013.01); *H04N 21/258* (2013.01); *H04N 21/431* (2013.01);
(Continued)

(58) Field of Classification Search
CPC ............... H04N 21/258; H04N 21/431; H04N 21/43615; H04N 21/4402; H04N 21/4424; H04N 21/4516
(Continued)

(56) References Cited

U.S. PATENT DOCUMENTS 6,408,350 B1 * 6/2002 Kawamura ....... H04L 12/40013
709/200
6,772,205 B1 * 8/2004 Lavian ................ H04L 41/0213
370/254
(Continued)

FOREIGN PATENT DOCUMENTS

JP  2005175969  6/2005
KR  100713975  5/2007
(Continued)

OTHER PUBLICATIONS

Bruno Volckaert et al., "Gridification of Collaborative Audiovisual Organizations through the MediaGrid Framework", Future Generation Computer Systems, Mar. 5, 2008, 19 pages.
(Continued)

*Primary Examiner* — Edward Kim
(74) *Attorney, Agent, or Firm* — The Farrell Law Firm, P.C.

(57) ABSTRACT

A system for operating an electronic device supporting enhanced data processing is provided. The system includes a plurality of electronic devices supporting playback of content; and a managing device delivering content whose data is processed by a certain electronic device among the plurality of electronic devices to a preset electronic device when playback of the content in the certain electronic device is requested.

11 Claims, 7 Drawing Sheets

(51) Int. Cl.
*H04N 21/258* (2011.01)
*H04N 21/431* (2011.01)
*H04N 21/4402* (2011.01)
*H04N 21/442* (2011.01)
*H04N 21/45* (2011.01)

(52) U.S. Cl.
CPC ..... *H04N 21/4402* (2013.01); *H04N 21/4424* (2013.01); *H04N 21/4516* (2013.01)

(58) Field of Classification Search
USPC ....... 709/223, 224, 239, 246, 201–203, 217, 709/219, 230, 231, 232, 237
See application file for complete search history.

(56) References Cited

U.S. PATENT DOCUMENTS

| | | | |
|---|---|---|---|
| 2004/0139480 A1* | 7/2004 | Delpuch | H04N 7/17318 725/135 |
| 2006/0161635 A1* | 7/2006 | Lamkin | G06F 17/30041 709/217 |
| 2007/0124412 A1* | 5/2007 | Narayanaswami | H04L 12/2602 709/217 |
| 2007/0276516 A1 | 11/2007 | Kaarela et al. | |
| 2008/0162697 A1 | 7/2008 | Griffin et al. | |
| 2011/0119406 A1* | 5/2011 | Chang | G06Q 10/00 710/6 |
| 2011/0164180 A1* | 7/2011 | Lee | G06F 3/1423 348/521 |
| 2011/0246761 A1* | 10/2011 | Alexandrov | H04L 9/00 713/150 |
| 2012/0192230 A1* | 7/2012 | Algie | H04N 21/234309 725/38 |
| 2012/0297423 A1* | 11/2012 | Kanojia | H04N 21/25808 725/48 |
| 2012/0304233 A1* | 11/2012 | Roberts | H04N 21/23113 725/82 |

FOREIGN PATENT DOCUMENTS

| | | |
|---|---|---|
| KR | 1020090039182 | 4/2009 |
| KR | 1020100090453 | 8/2010 |
| KR | 1020110052817 | 5/2011 |
| KR | PCT/KR2012/008888 | 3/2013 |

OTHER PUBLICATIONS

European Search Report dated Jun. 29, 2015 issued in counterpart application No. 12843716.7-1905, 10 pages.

* cited by examiner

FIG. 4

| DEVICE INFORMATION | COMPATIBLE INFORMATION |
|---|---|
| ○ TV<br>○ PC<br>○ NOTEBOOK COMPUTER<br>○ AUDIO DEVICE<br>○ HOME THEATER | ○ AUDIO DEVICE  ○ TV<br>PC<br>HOME THEATER |
| CONTENTS CONSIGNMENT INFORMATION | CONTENTS OUTPUT SUPPORT INFORMATION |
| ○ TV → PC<br>○ TV → HOME THEATER | ○ TV → PC<br>↓<br>HOME THEATER |

CONTENTS CONSIGNMENT FUNCTION — 141
41 — DEVICE INFORMATION
43 — COMPATIBLE INFORMATION
45 — CONTENTS CONSIGNMENT INFORMATION
47 — CONTENTS OUTPUT SUPPORT INFORMATION

SYSTEM AND METHOD FOR OPERATING ELECTRONIC DEVICE SUPPORTING ENHANCED DATA PROCESSING, APPARATUS AND TERMINAL SUPPORTING THE SAME

PRIORITY

This application claims priority under 35 U.S.C. §119(a) to a Korean patent application filed on Oct. 26, 2011 in the Korean Intellectual Property Office and assigned Serial No. 10-2011-0109807, the entire disclosure of which is incorporated herein by reference.

BACKGROUND OF THE INVENTION

1. Field of the Invention

The present invention relates generally to an operation of an electronic device, and more particularly, to a system and a method for operating an electronic device supporting enhanced data processing, by performing data processing and outputting the result to a certain electronic device using the electronic device capable of performing enhanced data processing when processing certain data by a plurality of electronic devices.

2. Description of the Related Art

Since the discovery of electricity, various types of electronic devices have been developed, including electronic appliances used in households as well as electronic devices in offices and factories. For example, there are lighting devices such as a fluorescent lamp or an incandescent lamp, a temperature controller such as an air conditioner or a heater, and various electronic appliances such as a TeleVision (TV), a computer, an electric fan, or a refrigerator.

Recently, various electronic devices capable of processing data have been developed. Users perform operations on various types of data using various electronic devices. For example, users operate an MP3 player to listen to playback of a music file, and a desktop computer to use an online game or a casual game. Further, the users operate a TV system to listen to broadcasting and operate a home theater system to view movies.

However, various electronic devices have a disadvantage in that it is difficult to share files and controlling corresponding devices is inconvenient. However, prior devices have a problem in that a user cannot listen to content of suitable quality due to terminals characteristics in an environment sharing various content. For example, a function allowing a user to view broadcasting through a computer is provided.

The size of a broadcasting screen provided through a computer is small. Although hardware capable of processing enhanced data is available, a user may not be able to view broadcasting in a normal manner due to the screen size and data transmission characteristic. Accordingly, there is a need to develop a technology capable of providing content having the quality requested from a user using various electronic devices.

SUMMARY OF THE INVENTION

The present invention has been made in view of the above problems, and provides a system and a method for operating an electronic device supporting enhanced data processing capable of using content of greater than a predetermined quality or a high quality by processing enhanced data using a plurality of electronic devices, an apparatus and a terminal supporting the same.

In accordance with an aspect of the present invention, a system for operating an electronic device supporting enhanced data processing is provided. The system includes a plurality of electronic devices supporting playback of content; and a managing device that delivers content whose data is processed by a certain electronic device among the plurality of electronic devices to a preset electronic device when playback of the content in the certain electronic device is requested.

In accordance with another aspect of the present invention, a managing device supporting enhanced data processing is provided. The device includes a communication unit for establishing a communication channel with a plurality of electronic devices; a device memory for storing content delivery information such that data processing of content is delivered to a preset electronic device when playback of content whose data is processed in a certain electronic device of the plurality of electronic devices is requested; and a device controller for controlling a content delivery function based on the content delivery information.

In accordance with another aspect of the present invention, a terminal supporting enhanced data processing is provided. The terminal includes a radio frequency communication unit for establishing a communication channel with a managing device controlling a content delivery function based on content delivery information such that the data processing of the content is delivered to a preset electronic device when playback of content whose data is processed in a certain electronic device among a plurality of electronic devices is requested; a terminal input unit for generating an input signal for configuring and upgrading the content delivery information; a terminal display unit for outputting a content delivery information support interface for supporting the configuration and the upgrading the content delivery information; and a terminal controller for supporting the formation of the communication channel with the managing device and the output of the content delivery information support interface.

In accordance with another aspect of the present invention, a method for operating an electronic device supporting enhanced data processing is provided. The method includes requesting playback of content whose data is processed in a certain electronic device of a plurality of electronic devices; delivering content to be transferred to the certain electronic device to a preset electronic device according to the request of the playback of the content such that the preset electronic device processes data of the content; and transferring the content whose data is processed to the certain electronic device or another designated electronic device.

In accordance with another aspect of the present invention, a method for operating a managing device supporting enhanced data processing is provided. The method includes monitoring a request of playback of content in a certain electronic device among a plurality of electronic device by the managing device connected to the electronic devices; confirming content delivery information such that a data process of the content is delivered to a preset electronic device set when playback of the content is requested by the managing device; and transferring content to be transferred from a content provider to the certain electronic device to the preset electronic device based on the content delivery information by the managing device.

BRIEF DESCRIPTION OF THE DRAWINGS

The aspects, objects, features, and advantages of the present invention will be more apparent from the following detailed description in conjunction with the accompanying drawings, in which:

FIG. 4 illustrates a content delivery information support interface according to an embodiment of the present invention;

DETAILED DESCRIPTION OF EMBODIMENTS OF THE INVENTION

Embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 1:
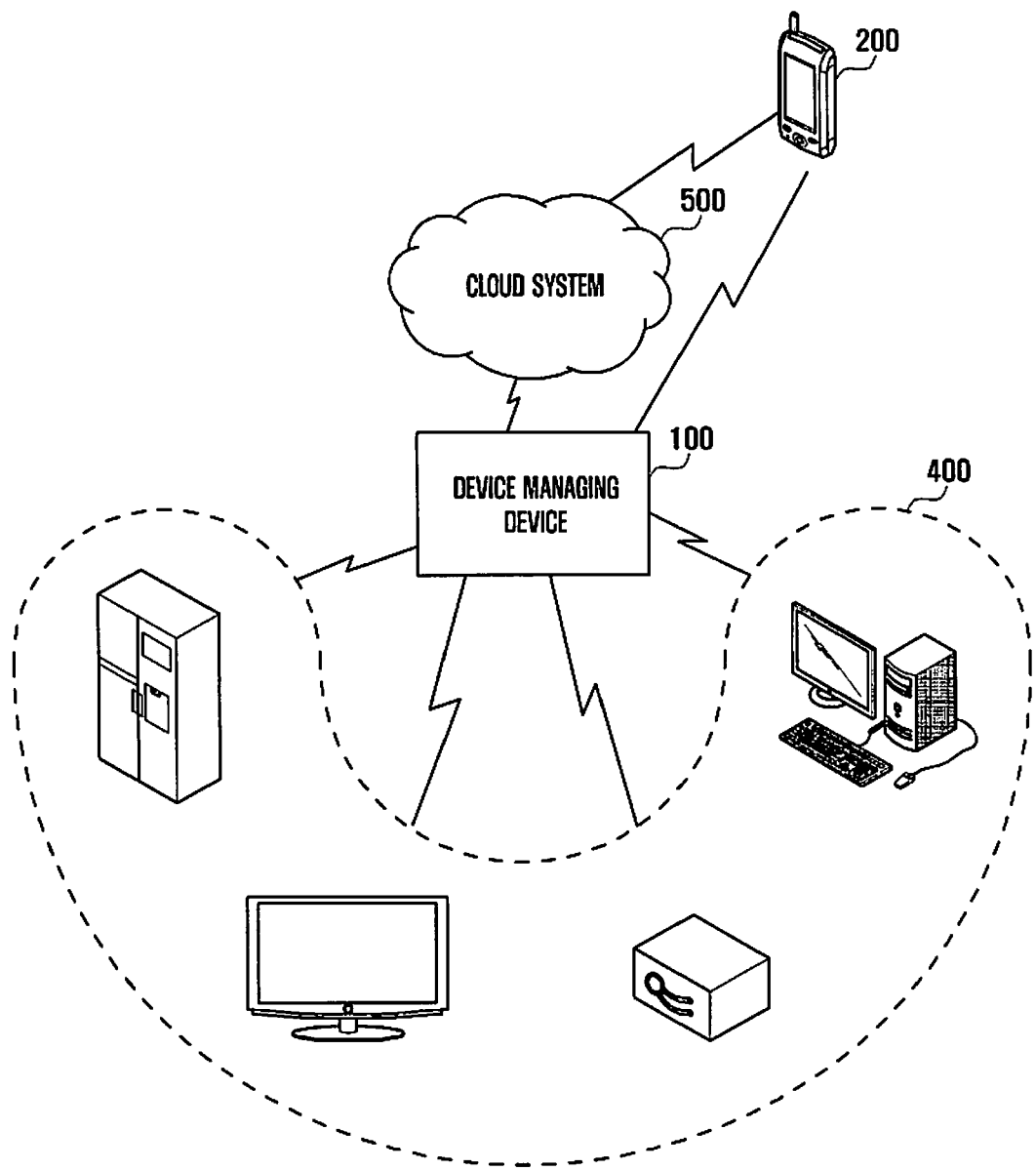
FIG. 1 illustrates a configuration of a system for operating an electronic device according to an embodiment of the present invention.

FIG. 1 illustrates a configuration of a system 10 for operating an electronic device according to an embodiment of the present invention.

Referring to FIG. 1, a system 10 for operating an electronic device according to an embodiment of the present invention includes a plurality of electronic devices 400, a managing device 100, and a terminal 200. The system 10 also includes a cloud system 500.

The system 10 for operating an electronic device according to the present invention searches other electronic devices whose delivery for processing data of corresponding content is possible according to a user request or previous setting when content is operated by a certain electronic device of the electronic devices 400. When the data processing ability of the other searched electronic devices is better than that of a certain electronic device, the system 10 processes data including corresponding content in the searched electronic devices, such that content that are processed are output to a designated electronic device. Accordingly, the system 10 for operating an electronic device according to the present invention allows a user to view the content in a quality greater than a predetermined value (e.g., a high quality video) during a process of operating (e.g., viewing or listening) the content.

The cloud system 500 is capable of storing and managing content delivery information required to send and receive signals necessary for delivering content of the managing device 100 on a network. The cloud system 500 may be omitted, and if so, the managing device 100 creates and provides content delivery information on its own or based on user input.

The cloud system 500 provides content to be operated in at least one of the electronic devices 400 through the managing device 100. To accomplish this, the cloud system 500 includes at least one server device for providing content to be operated in the electronic devices 400. When the cloud system 500 provides the content to the managing device 100, corresponding content includes information on a certain electronic device to be played and characteristic information of the corresponding content. The characteristic information of the content includes resolution, audio quality information, and/or data amount information of content. Accordingly, the managing device 100 confirms the characteristic information of content for searching other electronic device. If content may be output with high quality delivery, the managing device 100 controls such that delivery of the content is processed through the searched electronic device.

The user accesses the cloud system 500 through a certain electronic device or the managing device 100 connected to the certain electronic device, and accordingly selects certain content directly to be played by a corresponding electronic device. Accordingly, the cloud system transfers the corresponding content to an electronic device through the managing device 100. The content are directly transferred to a certain electronic device without going through the managing device 100. The managing device 100 forms a communication channel with an electronic device, detects a content playback request, and determines whether delivery processing of corresponding content should be performed according to the detection of the playback request.

The electronic devices 400 include a refrigerator, a TeleVision (TV), a washing machine, a computer, and the like, and include a series of devices to be operated according to content delivery information.

The electronic devices 400 are devices located in one location as one household, one office, or one factory, in which content data is processed in a predetermined electronic device.

The electronic devices 400 include a plurality of electronic devices having at least one of a data processing ability of content capable of being processed according to the characteristics of respective devices and output ability capable of outputting the processed data. That is, hardware including data processing ability higher than that of other electronic devices is included in a certain electronic device included in the electronic devices 400 and the certain electronic device processes data using the hardware. Further, hardware having data output ability of a quality higher than that of other electronic devices is included in the certain electronic device and the certain electronic device processes data using the hardware. FIG. 4 shows that the electronic devices 400 include a refrigerator, a TV, a washing machine, a computer, and the like. However, the present invention is not limited thereto. The electronic devices 400 further include various electronic devices, for example, a bed, an electric pan, an audio system, a dryer, an electronic oven, a home theater system, and the like.

The managing device 100 stores content delivery information associated with the playback of content in the electronic devices 400, and controls such that content data playback-requested from a certain electronic device are processed by an electronic device, the electronic device being set based on content delivery information. Further, the managing device 100 controls such that content whose data is processed are output to a certain electronic device. Accordingly, the managing device 100 supports data processing of high quality in a procedure of playing content. Such a function is improved because the characteristics of components of electronic devices are designed differently from one another. For example, hardware having excellent data processing ability and hardware having relatively low output ability are included in a desktop computer. Hardware having excellent data output ability and hardware having data processing ability lower than that of the desktop computer are included in a TV. In such an environment, the managing device 100 of the present invention enables a computer device to process broadcasting content data received by a TV device, thereby generating an high quality image, and outputting the generated high quality image to a data output means on the TV device (e.g., a monitor). Accordingly, the user views content in high quality. Management of an electronic device by the managing device 100 will be described in detail with reference to following drawings below.

The terminal 200 communicates with the managing device 100, and receives information, for example, content delivery information is provided from the managing device 100 such that the user can confirm the information. Further, the terminal 200 receives a command capable of designating a delivery receiving device content during a procedure of configuring content delivery information from a user and provide the received command to the managing device 100. When content data that is requested to be played (playback-requested) is processed by a searched electronic device, the terminal 200 generates a corresponding information alarm. Based on this alarm, the user checks whether an electronic device set by supporting a delivery function is used in a procedure of playing certain content. A detailed configuration of the terminal and another embodiment based on the terminal will be described in detail with reference to the following drawings.

As described above, the system 10 for operating an electronic device processes content data playback-requested by the user or requested to be played according to schedule information based on a managing device 100 connected to a plurality of electronic devices 400 based on an electronic device capable of processing data with high quality content. Accordingly, the system 10, for operating an electronic device, allows a user to view content in optimal or high quality based on an electronic device used by the user.

Figure 2:
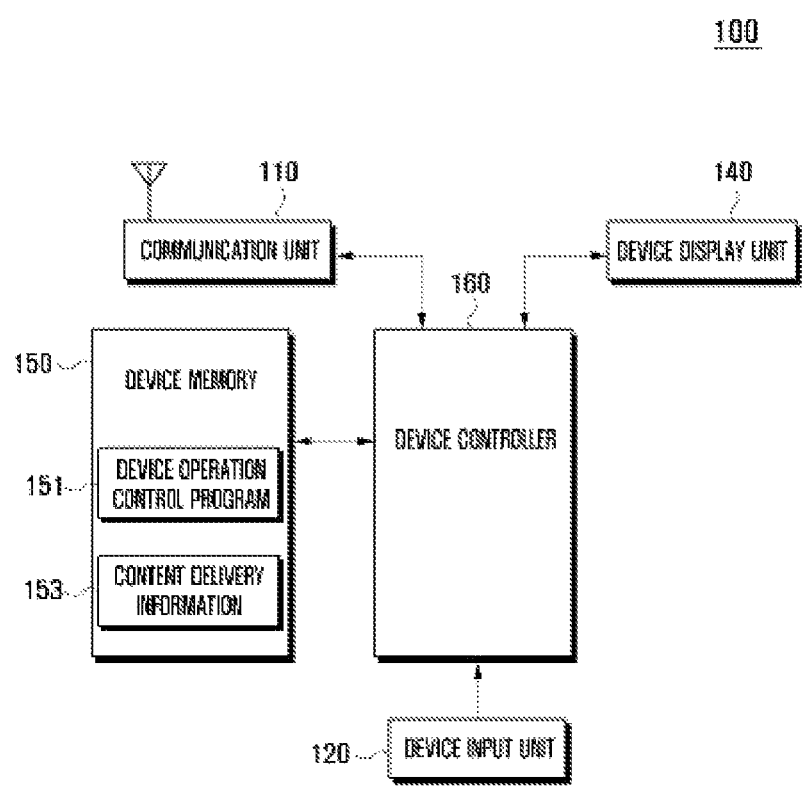
FIG. 2 illustrates a configuration of a managing device in detail according to an embodiment of the present invention.

FIG. 2 illustrates a configuration of a managing device 100 in detail according to an embodiment of the present invention.

Referring to FIG. 2, the managing device 100 of the present invention includes a communication unit 110, a device input unit 120, a device display unit 140, a device memory 150, and a device controller 160.

The managing device 100 establishes a communication channel with a plurality of electronic devices 400 and collects device information of the electronic devices 400. The managing device 100 generates content delivery information based on the collected device information. The device information includes hardware specification information of the electronic devices. That is, the device information includes at least one of specification information of the graphic card included in a corresponding electronic device, specification information of a monitor, specification information of a Central Processing Unit (CPU), power consumption information, data output specification information, and data transmission specification information based on characteristics of respective electronic devices. The generated content delivery information is used to control processing and output of content data playback-requested in a certain electronic device. Accordingly, the managing device 100 supports the processing and output of content data having excellent quality.

To accomplish the above, the communication unit 110 establishes a communication channel with a plurality of electronic devices 400 such that the managing device 100 controls a plurality of electronic devices 400. Further, the communication unit 110 establishes a communication channel between the managing device 100 and the terminal 200 to support the creation of content delivery information, transfers the content delivery information, transmits and receives information with respect to a content delivery information state based on the content delivery information. Further, the communication unit 110 establishes a communication channel between the managing device 100 and the cloud system 500, collects various information associated with data processing of content from the cloud system 500, and newly configures or upgrades content delivery information based on the collected information. The communication unit 110 provides device information of the electronic devices 400 to the cloud system 500, and receives content delivery information generated from the cloud system 500 based on corresponding device information, and transfers the received content delivery information to the device controller 160.

To accomplish this, the communication unit 110 establishes a communication channel according to one module and scheme of various types of communication modules and communication schemes. For example, the communication unit 110 includes a wired communication modem and a wireless communication modem to establish a communication channel with the electronic devices 400, and further includes a near distance communication module. Further, the communication unit 110 can be configured according to a Digital Living Network Alliance (DLNA) system to establish a communication channel between the electronic devices and the managing device 100. The communication unit 110 further includes a communication modem for communicating with the cloud system 500. When the cloud system 500 receives device information and provides content delivery information based on the web, the communication unit 110 uses a communication module and communication scheme for web access. Accordingly, it will be appreciated that the communication unit 110 of the present invention is not limited to a certain communication module or communication scheme but is a communication device capable of establishing a communication channel between a plurality of electronic devices 400 and the cloud system 500 or the terminal 200.

The device input unit 120 generates various input signals necessary for the operation of the managing device 100. Such a device input unit 120 can include a keyboard, a keypad, or a key button according to the compatibility of the managing device 100. When the display unit 140 is provided by a touchscreen, the device input unit 120 is configured as a touch map output to the touchscreen. The device input unit 120 generates an input signal for supplying power to the managing device 100, an input signal for setting a content delivery mode, an input signal for configuring content delivery information, and an input signal for upgrading the content delivery information according to a user request. The input signals are transferred to the device controller 160 such that execution of a function according to a corresponding input signal is supported.

The device display unit 140 provides various screen interfaces necessary for the operation of the managing device 100. For example, the device display unit 140 outputs a list of the electronic devices 400 controlled by the managing device 100. Further, the device display unit 140 outputs device information of the electronic devices 400, a content delivery information support interface configured by a plurality of electronic devices 400, and content delivery information generated through the content delivery information support interface. The content delivery information support interface is an interface supporting information generation defining delivering and performing data of corresponding content by another electronic device when playback of certain content is requested based on device information received from the electronic devices 400.

Accordingly, the content delivery information support interface provides index information of the electronic devices 400, device information of the respective electronic devices, compatibility information of the electronic devices, and a path definition item designating that another electronic device can perform data processing of corresponding content when certain content are played by a certain electronic device based on user designation. The controller 160 ensures that that data processing of certain content is performed in hardware of a higher specification based on device information and compatible information of devices. Accordingly, the content delivery information support interface provides the information, namely, electronic device path information that will deliver data processing of certain content by default. A user confirms the electronic device path information through the content delivery information support interface. If necessary, the user corrects or upgrades a path allocation to a desired electronic device.

The device display unit 140 is provided with a touch panel. The display unit 140 acts as an input means that generates a touch event according to a touch operation of a user and transfers the generated touch event to the device controller 160. The device display unit 140 provides information regarding which content data is processed in any electronic device according to content delivery information according to content delivery information and the processed data is transferred to another electronic device. The user checks whether data of certain content is being processed in a certain electronic device by confirming the information The device memory 150 stores one or more operating systems, various application programs and algorithms necessary for an operation of the managing device 100. In particular, the device memory 150 stores a device operation control program 151 and content delivery information 153.

The device operation control program 151 is a program for controlling a plurality of electronic devices 400 according to content delivery information 153 of the present invention. When a content delivery function is supported, the device operation control program 151 is loaded in the device controller 160 and supports a content delivery function. To accomplish this, the device operation control program 151 includes a routine determination as to whether a content delivery mode is set to electronic devices or a certain electronic device with as a default, a routine detecting generation of a content playback request in a corresponding electronic device, and a routine checking content delivery information 153 when playback of the content is requested to control such that data of corresponding content is processed by a designated electronic device.

Further, the device operation control program 151 includes a routine for controlling output of content whose data are processed by a certain electronic device playback-requested for content or output of the content by an electronic device according to setting. The device operation control program 151 includes a routine supporting output of the foregoing content delivery information support interface and a routine for newly configuring or upgrading content delivery information according to an operation of a content delivery information support interface.

In particular, the content delivery information 153 includes information processing content data playback-requested from a certain electronic device by another electronic device and information outputting content whose data is processed in another electronic device by a set electronic device. The content delivery information 153 includes content delivery rejection reference information according to a processing amount of data by a certain electronic device and information of another electronic device transferring delivered content when delivery of the content is rejected.

The device controller 160 controls the flow of various signals and collection and output of information to support a content delivery function according to an embodiment of the present invention. The device controller 160 supports the generation and upgrade of the content delivery information 153, and controls delivery processing and output of playback-requested content based on the generated content delivery information 153. The device controller 160 includes structural elements as illustrated in FIG. 3.

Figure 3:
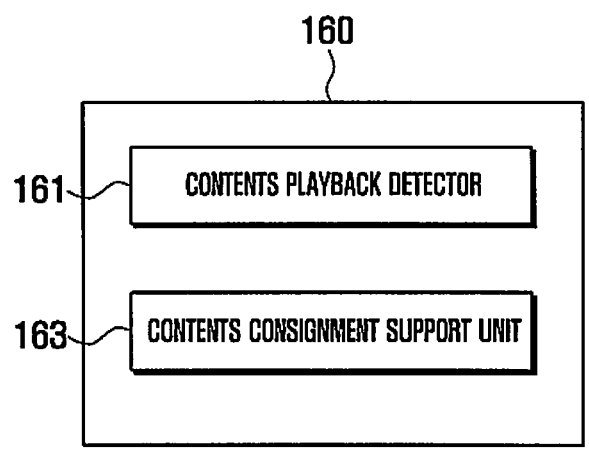
FIG. 3 illustrates a configuration of the device controller of FIG. 2 in detail.

FIG. 3 illustrates a configuration of a device controller 160 shown in FIG. 2 in detail.

Referring to FIG. 3, the device controller 160 of the present invention includes a content playback detector 161 and a content delivery support unit 163. The content playback detector 161 detects playback of content in a plurality of electronic devices 400 connected to the communication unit 110. To accomplish this, the content playback detector 161 monitors playback of content in a plurality of electronic devices 400, particularly, at least one electronic device registered to deliver data processing of content from content delivery information. To accomplish this, the content playback detector 161 confirms content delivery information 153 stored in the device memory 150. Further, when playback of certain content is requested from a certain electronic device, namely, an electronic device registered in the content delivery information, the content playback detector 161 transfers information indicating whether playback of corresponding content is delivered to a corresponding electronic device or the terminal 200. When information indicating delivery processing is received or playback of content is set to be delivery-processed, the content playback detector 161 requests transmission of content to be played by a corresponding electronic device. When receiving content from a corresponding electronic device, the content playback detector 161 transfers the received content to a content delivery support unit 163.

The content delivery support unit 163 designates an electronic device having performed data processing of received content under the control of the content playback detector 161 and transfers it thereto. When receiving a message with respect to data processing completion from the electronic device having performed the data processing, the content delivery support unit 163 controls such that corresponding content are transmitted to a preset electronic device, for example, an electronic device to which playback of content is requested. Furthermore, the content delivery support unit 163 performs a procedure of checking from a user to which electronic device outputs content whose data are processed. To accomplish this, the content delivery support unit 163 controls the device display unit 140 or the terminal 200 to output a message for designating a content output electronic device. When a signal with respect to designation of the content output electronic device or an electronic device outputting content is set, the content delivery support 163 controls a data processing electronic device to transfer content whose data are processed to a corresponding electronic device.

The content delivery support unit 163 supports the generation and upgrade of content delivery information. To accomplish this, the content delivery support unit 163 supports output of content delivery information support interface to the device display unit 140. Further, the content delivery support unit 163 supports such that the terminal 200 outputs content delivery information support interface according to a user request. Moreover, the content delivery support unit 163 does not support content delivery information support interface output but receives, stores, and operates content delivery information 153 from the terminal 200. The terminal 200 performs a function of generation and upgrade of the content delivery information 153.

A content delivery support unit 163 of the present invention confirms a processing amount of data to be processed by a certain electronic device. When the processing amount of the data is greater than or equal to a predetermined amount, the content delivery support unit 163 transfers content set to be transmitted to a corresponding electronic device to another electronic device. To accomplish this, the content delivery support unit 163 confirms the content delivery information 153 to extract content delivery rejection reference information of a certain electronic device. When a current processing amount of the data in a corresponding electronic device corresponds to a content delivery rejection reference, the content delivery support unit 163 controls the stand-by of data processing of additional content or transfers the additional content to an electronic device set to perform data processing in a next priority. The additional content includes content to be delivered to a corresponding electronic device after transmission of content whose data is currently processed, content having a type different from that of content whose data is currently processed, and content transmitted from an electronic device having a type different from that of an electronic device that transmitted the content whose data are currently processed. That is, the content delivery support unit 163 of the present invention schedules such that distribution with respect to data processing is achieved during a procedure of performing data processing by a certain electronic device.

FIG. 4 is a diagram illustrating an example of a content delivery information support interface according to an embodiment of the present invention. As described above, a content delivery information support interface of the present invention is output on the device display unit 140 under the control of the managing device 100, and is output on a terminal display unit 240 under the control of the terminal 200.

Referring to FIG. 4, a content delivery information support interface includes device information region 41, a compatible information region, a content delivery information region 45, and a content output support information region 47.

The device information region 41 is a region to which index information of a plurality electronic devices connected to one another through a communication unit 110 of the managing device 100 and hardware relation device information of respective electronic devices are output. To accomplish this, the managing device 100 requests index information and device information to respective connected electronic devices through the communication unit 110 and receives the index information and the device information from corresponding electronic devices. In particular, information output to the device information region 41 is limited to information of electronic devices capable of performing delivery and output content. Information is newly added to the device information region 41 according to a connection state of a communication unit 110 of respective electronic devices or removed in a registered state For example, after a notebook is included in the device information region 41, it is removed from a corresponding list according to presence of movement.

The compatible information region 43 is a region of displaying a compatible state between respective device information registered in the device information region 41. For example, content to be output to a TV receiver are compatible with a computer device. Furthermore, audio content output to the TV receiver are compatible with an audio device. Accordingly, the compatible information indicates the presence of delivery of content.

The content delivery information region 45 is a region of displaying information of another electronic device performing data processing associated with playback of content of a certain electronic device. That is, the TV receiver performs delivery setting with a computer device. The content delivery information region 45 distinctly displays information of an electronic device having a data processing function and information of an electronic device delivering content for data processing.

The content output support information region 47 is a region to which information designating an electronic device outputting content in which processing is delivered. When a separate electronic device is not designated, the content output support information region 47 outputs information setting an electronic device requesting delivery of content as an output electronic device.

As described above, the managing device 100 supporting enhanced data processing, according to an embodiment of the present invention, performs data processing of content using an electronic device including hardware of high specification in data processing of certain content to minimize an amount of data lost in a data processing procedure, so that a user can view content of high quality. Further, the managing device 100 of the present invention achieves suitable data processing distribution in data processing to easily operate the entire system.

Figure 5:
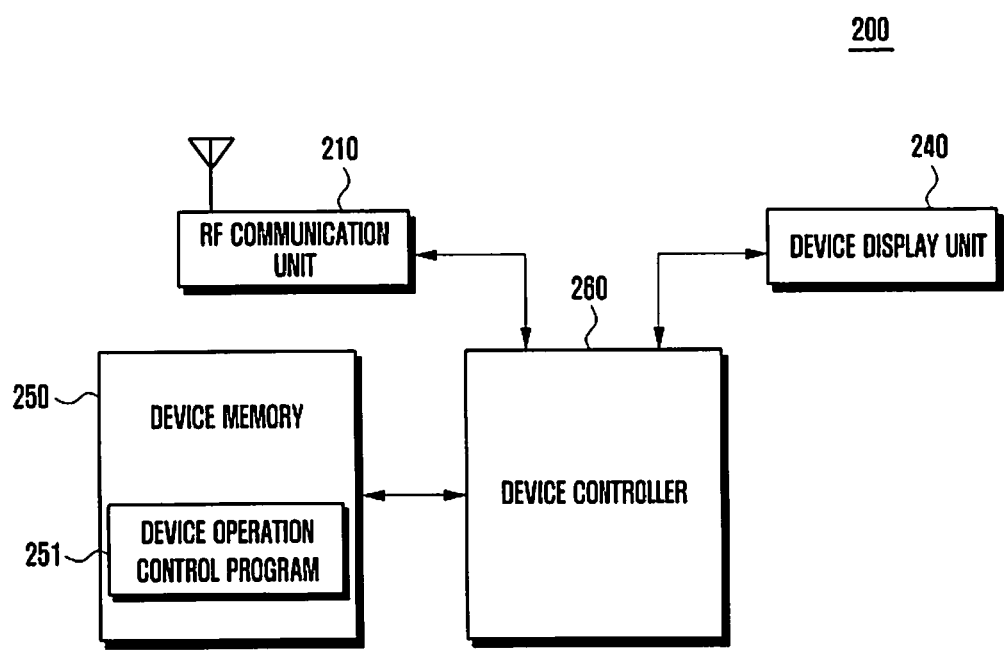
FIG. 5 illustrates a configuration of a terminal in detail according to an embodiment of the present invention.

FIG. 5 illustrates a terminal 200 in detail according to an embodiment of the present invention.

Referring to FIG. 5, the terminal 200 includes a Radio Frequency (RF) communication unit 210, a terminal display unit 240, a terminal memory 250, and a terminal controller 260.

The terminal 200 communicates with a managing device 100 using the RF communication unit 210 to receive content delivery information 153 provided from the managing device 100, and outputs the received content delivery information 153 to the terminal display unit 240. Furthermore, the terminal 200 outputs the foregoing content delivery information support interface to support generation and upgrade of the content delivery information 153.

The RF communication unit 210 establishes a communication channel with the managing device 100 and receives information provided from the managing device 100, for example, information associated with content delivery information 153, content delivery state information, content output support information, or the like. The content delivery state information includes information about delivering processing of playback-requested content by a certain electronic device. The content output support information includes information about a preset certain electronic device outputs content in which processing is delivered. The foregoing information is transferred to the terminal controller 260.

The RF communication unit 210 performs the same function as that of the communication unit of the managing device 100 to collect device information of the electronic devices 400. The collected device information is transferred to the terminal controller 260, and the terminal controller 260 supports various function controls associated with delivery of content instead of the managing device 100. To accomplish this, the RF communication unit 210 delivers and controls such that another electronic device processes content data in an electronic device in which playback of content is requested, and transfers various signals such that a preset electronic device or an electronic device to which playback is requested outputs the delivery-processed content.

The terminal display unit 240 outputs various screens necessary for an operation of the terminal 200. The terminal display unit 240 includes a touchscreen in the same manner as in the device display unit 140 of the managing device 100 and functions as an input means. When the RF communication unit 210 receives various information from the managing device 100, the terminal display unit 240 outputs various received information. That is, the terminal display unit 240 outputs content delivery information 153, content delivery information support interface, content delivery state information, and content output support information. The foregoing interface is received and provided from the managing device 100, is installed in the terminal 200 itself as a program, and be provided according to activation request of a corresponding pro gram.

To accomplish this, the terminal memory 250 stores a device operation program 251. The device operation program 251 is a program similar to the device operation control program 151 stored in the device memory 150 of the managing device 100, and controls a content delivery support function of the present invention based on the terminal 200. Additionally, the device operation program 251 remotely controls a plurality of electronic devices 400 through accessing a web server or the cloud system 500 since the terminal 200 is mobile. The managing device 100 is provided between the electronic devices 400 and the terminal 200 and functions as a gateway. The managing device 100 receives information regarding content delivery control of the electronic devices from a web or the cloud system 500 and transmits the received information to the respective electronic devices. Further, the terminal 200 stores content delivery information in the terminal memory 250 in the same manner as in the managing device 100. The terminal 200 supports output of content delivery information support interface based on content delivery information. The terminal memory 250 stores an operating system and various application programs necessary for an operation of the terminal 200.

The terminal controller 260 controls signal flow, transmitting and receiving and outputs information according to various functions of the terminal 200 associated with a content delivery function according to an embodiment of the present invention. For example, when the terminal 200 outputs information provided from the managing device 100 to the terminal display unit 240 and transmits an input signal of the user to the managing device 100, the terminal controller 260 receives at least one of the foregoing various interfaces and information through the RF communication unit 210. The terminal controller 260 supports output of received information to the terminal display unit 240. When a user selects a certain item or inputs preset values to generate and upgrade content delivery information in a procedure of outputting content delivery information support interface, the terminal controller 260 transfers corresponding information to the managing device 100. Through such flow control, the terminal controller 260 outputs various information generated while the managing device 100 controls the electronic devices 400 according to the content delivery information 153 through the terminal 200 and transfers a user request to the managing device 100.

Additionally, when the terminal 200 is substituted for the managing device 100, the terminal controller 260 performs a function of the device controller 160 as shown in FIG. 3 such that the terminal independently performs output of the foregoing interface configuration and information. Moreover, when the terminal 200 is spaced apart from a situated zone of the electronic devices 400 by greater than a predetermined distance, the terminal controller 260 establishes a communication channel for controlling the electronic devices 400 and supporting transmitting and receiving of the signal.

As mentioned above, the terminal 200 according to the embodiment of the present invention outputs information associated with content delivery function control of the electronic devices 400 and transfers a corresponding input signal. Accordingly, the terminal 200 of the present invention allows a user to conveniently set and operate a content delivery function of the present invention and to confirm a result according thereto.

The foregoing embodiment has illustrated configurations and functions of the electronic device managing system, the managing device, and the terminal supporting enhanced data processing according to the embodiment of the present invention. Hereinafter, a method for operating configurations for enhanced data processing will be described in detail with reference to the accompanying drawings.

Figure 6:
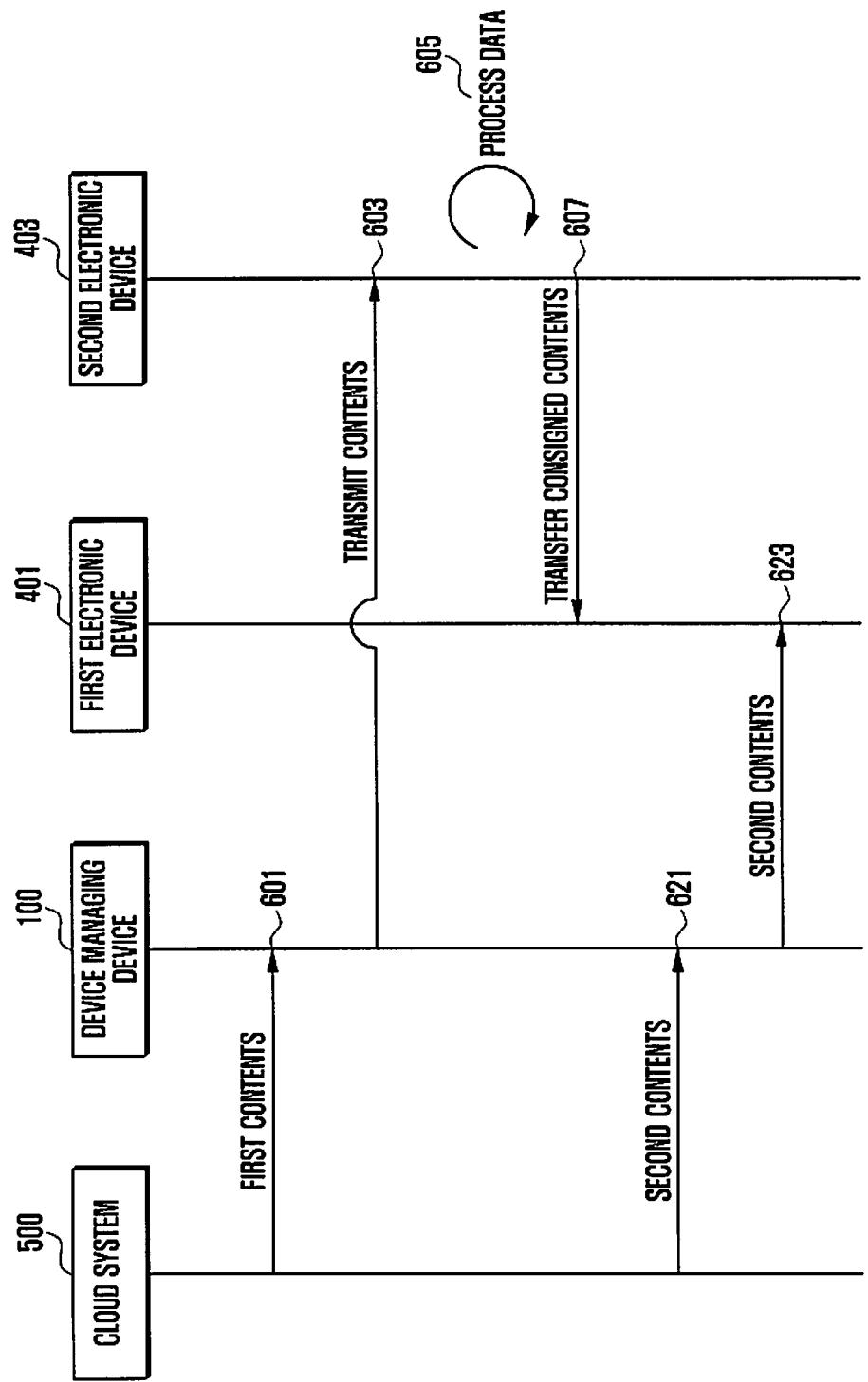
FIG. 6 is a flowchart illustrating a method for operating an electronic device to support a content delivery function according to an embodiment of the present invention.

FIG. 6 is a flowchart illustrating a method for operating an electronic device to support a content delivery function according to an embodiment of the present invention.

Referring to FIG. 6, in the method for operating an electronic device according to the present invention, a cloud system 500 first transmits first content to a managing device 100 in step 601. To accomplish this, the cloud system 500 establishes a communication channel with a managing device 100, and transfers the first content to the managing device 100 or transfers the first content requested from the managing device 100 to the managing device 100. The user directly controls the managing device 100 to access the cloud system 500 and generate an input signal requesting selection and transmission of the first content of content provided from the cloud system 500. Further, the user controls an electronic device connected to request first content for viewing to the cloud system 500. The foregoing embodiment has illustrated that the cloud system 500 provides the first content. However, the present invention is not limited thereto. That is, in the method for operating an electronic device according to the present invention, a broadcasting server directly providing content to electronic devices or various content providers such as other portable terminals may be substituted for the cloud system 500 or be connected to the cloud system 500.

When receiving the first content from the cloud system 500, the managing device 100 confirms a type of an electronic device having requested the first content. Further, the managing device 100 confirms characteristics of the first content. It is assumed that the first electronic device requests the first content and content of high quality are provided through enhanced data processing of the first content by the second electronic device 403. Accordingly, content delivery information 153 includes information set such that data of certain content played by the first electronic device 401 are processed by the second electronic device 403. The managing device 100 confirms the content delivery information 153 to transfer first content to the second electronic device 403.

The second electronic device 403 having received the first content from the managing device 100 performs data processing of the first content according to a request of the managing device 100 in step 605. For example, the second electronic device performs data processing for an image of the first content as an image of quality higher as compared with the first electronic device. The first electronic device 403 is a device including hardware having a relatively higher specification as compared with the first electronic device.

When the data processing is completed, the second electronic device 403 transfers first content delivery-processed to the first electronic device 401 in step 607. Then, the first electronic device 401 outputs the first content delivered and processed by the second electronic device 403 through an output means.

The cloud system 500 transfers the second content to the managing device 100 in step 621. It is assumed that the second content is playback-requested from the first electronic device 401, and data processing for the second content is performed by the first electronic device 401. Then, the managing device 100 controls such that the second content are transferred to the first electronic device 401. That is, when it is unnecessary to perform data processing of the second content by the second electronic device 403, the managing device 100 transfers the second content to the first electronic device 401 such that data processing for the second content is performed by the first electronic device 401. Accordingly, the first electronic device 401 performs data processing for the second received content and outputs corresponding content through an output means.

The foregoing embodiment has illustrated a method for operating an electronic device based on a configuration of receiving content from the cloud system 500 by the managing device 100 and delivering data processing for corresponding content to a preset electronic device. However, the present invention is not limited thereto. That is, a content delivery function supported from the managing device 100 is performed by a certain electronic device itself. Specifically, in the method for operating an electronic device according to the present invention, when playback of content whose data process is possible is requested in a certain electronic of a plurality of electronic devices, the certain electronic device performs a content delivery function such that content data to be transferred to the certain electronic device is delivery-processed according to a request of content playback. The electronic device transfers the content whose data are processed to the certain electronic device or another designated electronic device. In this procedure, when the managing device is designed to control a delivery function of content, the managing device connected to a plurality of electronic devices monitors that playback of the content in the certain electronic device is requested, receives content transferred to the certain electronic device from a cloud system, and transfers the content to the electronic device based on content delivery information.

As described above, the electronic device includes hardware supporting data processing of a relatively higher specification as compared with the certain electronic device.

Figure 7:
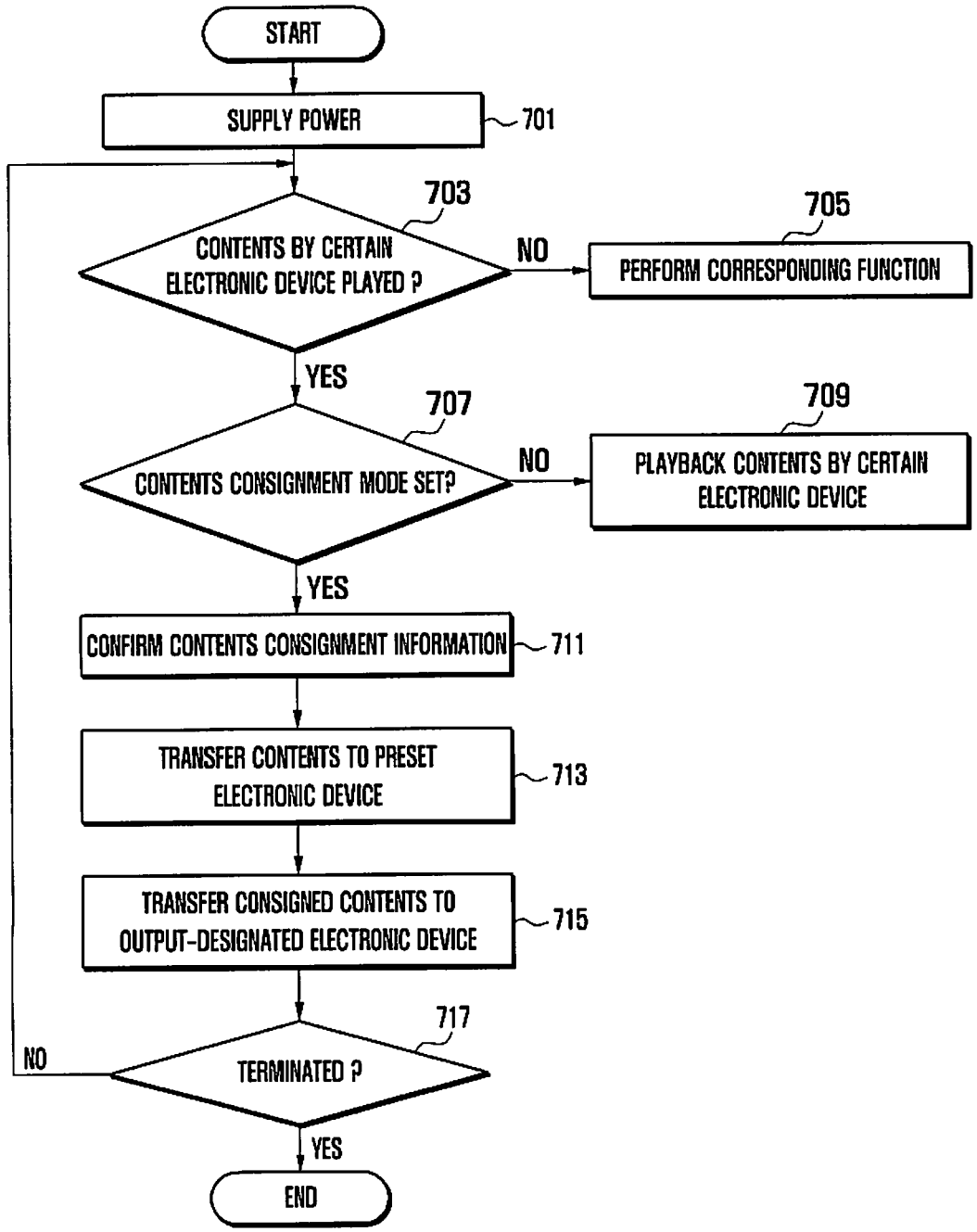
FIG. 7 is a flowchart illustrating a method for operating an electronic device for supporting the content delivery function according to an embodiment of the present invention.

FIG. 7 is a flowchart illustrating a method for operating an electronic device for supporting the content delivery function according to an embodiment of the present invention. As described above, when the terminal 200 performs a function of the managing device 100, the managing device 100 functions as a gateway of the electronic devices 400, following description is applicable to an operation of the terminal 200.

Referring to FIG. 7, in a method for operating a managing device according to the present invention, a device controller 160 of the managing device 100 supplies power necessary for operations of respective structural elements of the managing device 100 using power supplied from a power supply in step 701. When a certain event occurs, the controller 160 checks whether the event is an event for playing content by a certain electronic device in step 703. The event requesting playback of content is generated using a device input unit 120 and a device display unit 140 supporting a touch function provided in the managing device 100. The event requesting playback of content is received from at least one of a plurality of electronic devices 400 connected to a communication unit 110.

When the event is not the event for playing content at step 703, the device controller 160 performs a function according to a corresponding event characteristic in step 705. For example, the device controller 160 outputs current used state information of electronic devices 400 to the device display unit 140 or the terminal 200. Further, the device controller 160 controls signal flow for generation and upgrade of content delivery information 153 according to a corresponding event.

When the event is the event for playing content at step 703, the device controller 160 determines whether an electronic device playing corresponding content is set to be operated in a content delivery mode in step 707. The device controller 160 outputs a message confirming setting a content delivery mode during playback of corresponding content to the device display unit 140, the terminal 200, or a corresponding electronic device. When a separate content delivery mode is not set or an input signal instructing non-selection of a content delivery mode is received, the device controller 160 processes content data requested from the certain electronic device and plays the content in step 709. To accomplish this, the device controller 160 transfers a corresponding content request message to the cloud system 500 and receives the requested content. Further, the device controller 160 directly transfers the received content to a corresponding electronic device without separate delivery processing. Then, the corresponding electronic device processes data of the received content and output the processed content.

When the corresponding electronic device is set to the content delivery mode or an input signal for setting the content delivery mode is received at step 707, the device controller 160 confirms content delivery information 153 in step 711. That is, the controller 160 confirms an electronic device delivering content to be received. Simultaneously, the device controller 160 controls such that a request of playback of content is transferred to the cloud system 500. Accordingly, the managing device 100 receives content requested from the cloud system 500. When the content are received, the device controller 160 transfers content to a preset electronic device based on information confirmed from the content delivery information 153 in step 713.

The device controller 160 controls content to be delivered not to be concentrated to a certain electronic device according to a processing amount of data of the preset electronic device. For example, the device controller 160 compares an amount of content delivered to the preset electronic device with an amount of content whose data are processed by an electronic device to confirm an amount of data to be processed by a currently set electronic device. When the amount of data to be currently processed is greater than or equal to a preset value, the device controller 160 transfers content to be delivered to the preset electronic device to another electronic device or reject delivery of the content. When delivery of the content is rejected, the device controller 160 outputs information about delivery rejection to at least one of the device display unit 140, the terminal 200, and an electronic device in which playback of content is requested.

In step 715, the device controller 160 transfers delivered content to an output-designated electronic device. Step 715 may be omitted. That is, the device controller 160 provides information instructing transfer of content whose data is processed to a certain electronic device to output the content to a preset electronic device during a procedure of delivering content, the preset electronic device transfers delivery-processed content based on corresponding information.

The device controller 160 determines whether an input signal for terminating a content delivery function or an operation of the managing device 100 is generated in step 717. When an input signal for terminating a separate operation is not generated, the device controller 160 returns to step 703 and repeats the foregoing procedures.

The foregoing embodiment has illustrated that the managing device 100 receives content from the cloud system 500 by way of example. However, the present invention is not limited thereto. That is, the content delivery function of the present invention enables a content provider to directly provide content to an electronic device having requested playback of the content. The managing device 100 establishes and maintains a communication channel with electronic devices, and monitors which electronic device requests playback of the content. Particularly, the managing device 100 confirms the content delivery information 153 and monitors electronic devices in which a content delivery mode is set to check whether playback of content is requested. When the playback of content is requested in a certain electronic device, the managing device 100 outputs a message inquiring presence of application of a content delivery mode to at least one of the device display unit 140, the terminal 200, and an electronic device in which the playback request is generated. When an input signal for setting the content delivery mode is generated or the content delivery mode is set to default, the managing device 100 performs transfer of the content to a corresponding electronic device after applying the content delivery function.

The foregoing terminal 100 further includes various additional modules according to provision forms. That is, when the terminal 100 is a communication terminal, it includes a camera module for photographing still images/moving images of a subject, an interface for exchanging data in a wired communication scheme or a wireless communication scheme of the mobile terminal 100, an Internet communication module communicating with an Internet for communicating with the Internet, and a digital broadcasting module receiving and broadcasting digital broadcasting.

Further, the terminal 100 according to an embodiment of the present invention includes a storage unit and includes various types of device having a communication module for supporting a data communication service based thereon. For example, the terminal 100 includes an information communication device and a multimedia device such as a Portable Multimedia Player (PMP), a digital broadcasting player, a Personal Digital Assistant (PDA), a music player (e.g., MP3 player), a portable game terminal, a Smart Phone, a notebook computer, and a handheld Personal Computer (PC) as well as various mobile communication terminals corresponding to various communication systems.

As mentioned above, in the system and the method for operating an electronic device supporting enhance data processing and an apparatus and a terminal supporting the same according the present invention, the present invention may process content data provided to a user based on excellent hardware and output the processed content through a terminal designated by the user or an improved hardware device, so that content having excellent quality can be used.

While the present invention has been shown and described with reference to certain embodiments and drawings of the portable terminal, it will be understood by those skilled in the art that various changes in form and details may be made therein without departing from the spirit and scope of the invention as defined by the appended claims and their equivalents.

What is claimed is:

1. A method for operating managing device supporting enhanced data processing, the method comprising:
   detecting, by the managing device, a request for playback of content in a certain electronic device of a plurality of electronic devices; and
   delivering, from the managing device, to a preset electronic device of the plurality of electronic devices, the content an instruction to process data of the content to generate data-processed content, and an instruction to transfer the data-processed content to the certain electronic device or another designated electronic device of the plurality of electronic devices to perform playback of the data-processed content, according to stored content delivery information and the detected request for the playback of the content,
   wherein the content delivery information indicates, when playback of content by the certain electronic device is requested, the content is to be delivered to the preset electronic device to process the data of the content, and
   wherein the managing device, the certain electronic device, preset electronic device, and the other designated electronic device are each different devices.

2. The method of claim 1, wherein detecting the request for playback comprises:
   monitoring the request for the playback of the content in the certain electronic device; and
   receiving the content transferred to the certain electronic device from a cloud system by the managing device.

3. The method of claim 1, wherein the preset electronic device includes hardware supporting data processing having a higher specification as compared with the certain electronic device.

4. The method of claim 1, wherein a content delivery information support interface that supports at least one of a configuration and upgrade of content delivery information such that data processing of the content is delivered to the preset electronic device when the playback of the content by the certain electronic device is requested.

5. The method of claim 1, further comprising:
   confirming a processing amount of data of the preset electronic device; and
   transferring the content to be delivered to the preset electronic device to another electronic device or rejecting delivery of the content to the preset electronic device when the processing amount of data of the preset electronic device is at least equal to a preset value.

6. The method of claim 5, further comprising:
   transferring information regarding the rejection of the delivery when the delivery is rejected to at least one of a device display unit included in a managing device, a terminal establishing a communication channel with the managing device, and the certain electronic device having delivered the content.

7. A managing device supporting enhanced data processing, the device comprising:

a communication unit for establishing a communication channel with a plurality of electronic devices;

a device memory for storing content delivery information indicating that, when playback of content by a certain electronic device of the plurality of electronic devices is requested, the content is to be delivered to a preset electronic device of the plurality of electronic devices to process data of the content; and a device controller for:

detecting a request for playback of the content in the certain electronic device, controlling a content delivery function to deliver, to the preset electronic device, the content, an instruction to process the data of the content to generate data-processed content, and an instruction to transfer the data-processed content to the certain electronic device or another designated electronic device of the plurality of electronic devices to perform playback of the data-processed content based on the content delivery information and the detected request for playback of the content, wherein the managing device, the certain electronic device, the preset electronic device, and the other designated electronic device are each different devices.

8. The device of claim 7, further comprising:
a device display unit for outputting a content delivery information support interface supporting a configuration and upgrade of the content delivery information.

9. The device of claim 8, wherein the content delivery information support interface comprises:
an index region for classifying the plurality of electronic devices;
a compatibility information indicating compatibility between the plurality of electronic devices;
a region for storing the content delivery information; and
a region for storing a content output support information designating an electronic device outputting the delivery-processed content.

10. The device of claim 7, wherein the device controller confirms a processing amount of data in the preset electronic device, transfers the content to be delivered to the preset electronic device to another electronic device or rejects delivery of the content to be delivered, when the processing amount of the data is at least equal to a preset value.

11. The device of claim 10, wherein the device controller transfers information regarding the rejection of the delivery when the delivery is rejected to at least one of a device display unit included in the managing device, a terminal establishing a communication channel with the managing device, and the certain electronic device having delivered the content.

* * * * *